United States Patent [19]
Fulford

[11] 3,782,469
[45] Jan. 1, 1974

[54] FORMATION AND WELLBORE SCALE PREVENTION

[75] Inventor: Richard S. Fulford, Tulsa, Okla.

[73] Assignee: Cities Service Oil Company, Tulsa, Okla.

[22] Filed: May 25, 1972

[21] Appl. No.: 256,722

Related U.S. Application Data

[63] Continuation of Ser. No. 63,193, Aug. 11, 1970, abandoned.

[52] U.S. Cl. ............................... 166/279, 166/280
[51] Int. Cl. ............................................. E21b 43/26
[58] Field of Search .................. 166/279, 280, 308, 166/307, 309, 310; 252/8.55 A, 8.55 B, 8.55 E

[56] References Cited
UNITED STATES PATENTS

| | | | |
|---|---|---|---|
| 3,283,817 | 11/1966 | Roberts | 166/279 |
| 3,481,400 | 12/1969 | Kerver et al. | 166/279 |
| 3,258,071 | 6/1966 | Shen | 166/275 |
| 3,179,170 | 4/1965 | Burtch | 166/279 |
| 3,528,502 | 9/1970 | Oleen | 166/279 |
| 3,502,587 | 3/1970 | Stanford et al. | 166/279 UX |
| 3,483,925 | 12/1969 | Slyker | 166/279 |
| 3,467,192 | 9/1969 | Nolan, III et al. | 166/279 |

*Primary Examiner*—Stephen J. Novosad
*Attorney*—Elton F. Gunn et al.

[57] ABSTRACT

Disclosed herein is a method for the reduction of the scale deposition in the formation and fractures about a producing wellbore. In particular, gypsum scale deposition is avoided by the addition of scale preventative to an absorbent which may be used as a propping agent and positioned in hydraulically created fractures within the formation. Subsequent production from the formation, through the fractures, slowly bleeds the gypsum scale preventative into the produced water and thereby prevents gypsum scale deposition in the wellbore.

8 Claims, 1 Drawing Figure

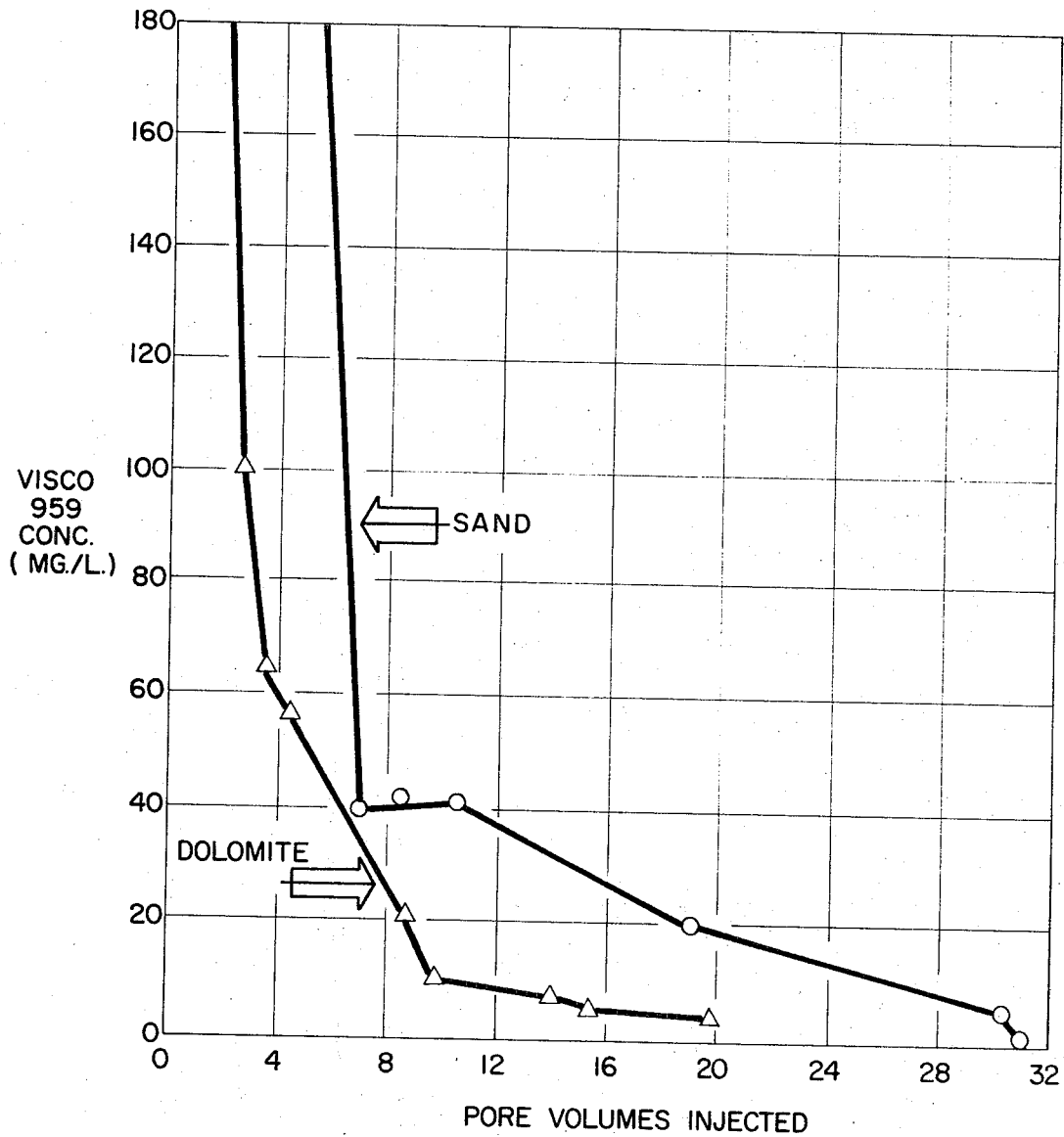

FORMATION AND WELLBORE SCALE PREVENTION

This application is a continuation of application Ser. No. 63,193, filed Aug. 11, 1970 now abandoned.

BACKGROUND OF THE INVENTION

This invention relates to the prevention of formation of scale deposits resulting, for example from the waterflooding of a reservoir for the secondary recovery of petroleum. More particularly, it relates to a method for conditioning a reservoir and the water contained therein by the introduction of a propping agent which is impregnated with scale preventative so that the preventative is slowly bled from the propping agent into the produced waters such that scale deposition does not occur in the vicinity of the production well.

Water injected into a reservoir to produce petroleum remaining in a reservoir after primary recovery may become supersaturated with scale, for example calcium sulfate, as it is driven through the reservoir at high pressure. As the flood waters approach the vicinity of an oil production well, initial pressures are diminished. During this diminishment of pressure the calcium sulfate solubility is rapidly reduced. At this point in the production drive cycle, calcium sulfate begins to precipitate out and form scale deposits in the vicinity of the wellbore and in particular in the wellbore itself. This scale impedes the flow of fluids and often shuts off the wellbore so that petroleum production from the reservoir is restricted.

Prior solutions for the prevention of scale deposition and for the removal thereof may be categorized into two classes of physical and chemical preventative means. The physical removal of scale may be accomplished by drilling the deposited scale from the well. This procedure is expensive and is accompanied by production time loss during the drilling and subsequent scale deposition on the active sites which were drilled by this cleaning procedure. Scale which has been deposited within the reservoir may not be removed by this manner. Alternate physical treatments have been proposed such as hydraulically fracturing the reservoir in order to bypass the scale that has been previously formed within the reservoir. It is noted that the hydraulic fracturing is only a temporary remedial solution as a newly created fracture zone quickly becomes deposited with gypsum scale with the wellbore again shut off to the remainder of the formation.

Chemical treatment of production wells with phosphates or polyacrylamides, which are scale preventatives, has been implemented to prevent scale from initially forming by blocking the active sites for scale deposition. Shen, U.S. Pat. No. 3,258,071, describes the use of these chemicals to minimize precipitation of insoluble metal compounds in flooding waters. Chemicals are placed in the wellbore or forced into the reservoir in order to prevent scale from precipitating therefrom. This method of treatment has serious drawbacks in that the chemical introduced into the wellbore will tend to mix with fluids at the top of the wellbore and thereby not mix within the well such that the fluids that enter from the bottom of the wellbore are untreated. Consequently, chemicals are relatively ineffective in preventing scale from forming at the bottom of the wellbore where the most severe scaling often occurs. A second problem with chemical treatment is that in order to prevent scale formation in the reservoir, chemicals must be introduced into the particular zones of the reservoir in which the scaling normally occurs. This procedure has not been successful as it is difficult to force chemicals selectively into those zones where scaling occurs most rapidly. Quite often, chemicals are forced into regions where scaling is not occuring, with the chemicals being wasted or lost to the formation with no scale prevention being derived.

What is required is a method by which flooding media may be treated such that the prevention of bivalent cation precipitation or the preferential lowering of the interfacial tension of surfaces to the cations of calcium, iron, magnesium, etc. is provided. By this treatment, the formation in the vicinity of the production well is left unobstructed and thereby no scale buildup produced therein so that no production loss or productivity of the well is incurred.

It is an object of this invention to provide an improved method for the recovery of petroleum from subterranean reservoirs during secondary recovery by waterflooding.

It is another object of the present invention to provide a method for preventing the precipitation of scale near the vicinity of a production well during the secondary recovery of petroleum by means of waterflooding.

It is still a further object of the present invention to provide a method for preventing the formation of gypsum scale in the vicinity of a production well during the secondary recovery of petroleum by the introduction of a gypsum scale preventative in combination with a propping agent such that continuous dissolution of the gypsum scale preventative from the propping agent occurs so that the flooding media is continually treated and no calcium sulfate deposition occurs therefrom.

With these and other objects and advantages of the present invention in mind, the invention will be more fully developed with particular reference to the following drawing and description:

SUMMARY OF THE INVENTION

The objects of the present invention are accomplished by the application of a process for the prevention of sulfate deposition in producing oil wells. The process comprises impregnating a propping agent with a scale preventative. The formation in the vicinity of the wellbore is hydraulically fractured with subsequent positioning of the impregnated propping agent within the hydraulic fractures created. After the propping agent has been positioned, the well is returned to a production cycle with oil and water produced through the newly created fracture network. Scale preventative is bled into the producing waters from the propping agent. By this method the producing waters are treated such that scale deposition does not occur in the vicinity of the wellbore or in the wellbore itself.

Generally, the formation is produced until the concentration of the scale preventative reaches a minimal level. In most applications of the method, this minimal level will be about ten parts per million preventative in the produced waters. Whereupon reaching this point in the production cycle, a fresh propping agent is reintroduced into the formation so that the formation is again conditioned for further productive cycles.

BRIEF DESCRIPTION OF THE DRAWING

The present invention may be more fully understood by referral to the following drawing in which:

The FIGURE represents the bleeding of the calcium sulfate scale preventative from the propping agent with increasing volumes of injection of driving fluid.

DETAILED DESCRIPTION OF THE INVENTION

Most successful field applications of scale preventatives have been found in sandstone formations wherein chemicals are released from the reservoir over relatively long periods of time such that continuous prevention of the scale formation is provided. In the application of preventatives to carbonate reservoirs, the adsorption process has not worked favorably in that the scale preventatives do not adhere sufficiently or adsorb well upon carbonates. Investigation of the adsorption of scale prevention chemicals has disclosed that chemicals may be adsorbed upon particular propping agents such that they may be introduced into a fracture network within a formation and positioned so that subsequent production from the formation continuously bleeds or de-adsorbs the scale preventative from the propping agent, thereby treating the produced waters and preventing scale deposition within the formation in the vicinity of the wellbore and the wellbore itself. By this procedure scale preventative is adsorbed on a propping agent, before introduction into the well and formation. Preceding the introduction of the propping agent, the well is hydraulically fractured. A fluid containing the propping agent therein is then introduced in the fractures so thus as the fractures settle upon the propping agents, the scale preventative is constantly bled into the fluid which passes about the propping agent so as to inhibit gypsum scale deposition in the formation, wellbore and upon the wellbore equipment.

This bleeding of the preventative may be timed by the amount of adsorption of scale preventative upon the propping agent. The most prevalent forms of scale found in reservoirs are of calcium sulfate or gypsum, barium sulfate, calcium carbonate, strontium carbonate, iron oxide, iron sulfide and magnesium sulfate precipitates. Although each of these forms may be prevented by the process of the present invention, for the purpose of illustration, the gypsum scale problem will be discussed herein although the scale preventatives enumerated will equally well prevent deposition of each of these scale producing compounds. Table 1 is illustrative of some of the gypsum scale preventative chemicals which may be utilized in the present invention and the amount of adsorption which may be maintained on sand, in particular, and other preferred propping agent, which may achieve specific concentrations of the gypsum scale preventative for the treatment. Therefore, Table 1 depicts the concentration of the solution for the addition of gypsum scale preventative to sand and the amount of preventative actually adsorbed upon the sand granules.

TABLE I

| Trade Name | Chemical Name | Adsorption on Sand Mg. adsorbed per kg. Sand | Chem. Concentration (Mg./l.) |
|---|---|---|---|
| Visco 959 | Organic Phosphate | 25 | 100 |
| | | 75 | 200 |
| | | 350 | 1,000 |
| | | 500 | 10,000 |
| Corext 7640 | Organic Phosphate | 29 | 100 |
| | | 25 | 200 |
| | | 25 | 1,000 |
| LP-53 | Poly Organic Acid (Probably Polyacrylic acid) | 47 | 15 |
| Dequest 2010 | 1-Hydroxy, 1,1 Diphosphonic Acid Ethane | 25 | 100 |
| | | 25 | 200 |
| | | 25-50 | 1,000 |
| Dowell L-37 | 50% Water Solution of Nitrilotris (Methylene) Triphosphonic Acid | 22 | 100 |
| | | 28 | 200 |
| | | 25 | 1,000 |
| Pusher 500 | Partially Hydrolyzed Polyacrylamide (25% of Amide Groups hydrolyzed to acid groups) | 80 | 500 |
| Polymer 454 | Highly Cross-Linked Polyacrylamide | 1100 | 500 |

To measure the amount of adsorption and subsequent amount of gypsum scale prevention which may be obtained by the present invention, the following examples were conducted:

EXAMPLE I

Adsorption of gypsum scale preventatives was measured on columns of crushed dolomite rock cores which were obtained from a West Texas well in which calcium sulfate scale deposition was prevalent. The rock was principally dolomite with small amounts of anyhydrite and shale. The columns were 20 inches long and 2 inches in diameter with 200 millimeters of a 1 percent gypsum scale preventative solution placed in the column and allowed to stand for 24 hours. During the soaking period, the gypsum scale preventative was adsorbed on the dolomite. Synthetic brine was then injected through the column with the preventative concentration of the affluent measured. The brine contained 45.8 grams per liter sodium chloride, 5 grams per liter calcium chloride and 1.9 grams per liter magnesium chloride. Analysis procedures for the preventatives were provided by the supplier chemical companies. Table 2 illustrates the gypsum scale inhibition which was found by the use of the two chemicals tested. This inhibition is measured in percent scale inhibition by standard measuring techniques.

TABLE 2

| Chemical | Chemical Concentration (ppm) | Percent Scale Inhibition |
|---|---|---|
| Visco 959 | 11 | 93 |
| | 22 | 100 |
| | 30 | 96 |
| L-37 | 11 | 18 |
| | 22 | 68 |
| | 37 | 97 |
| | 71 | 100 |

As can be seen, Visco 959, an organic phosphate, was found to have excellent scale preventative properties but poor adsorption properties, while L-37, a 50 percent water solution of nitrilotris or methylene triphosphonic acid, was found to have fair scale preventative properties, but extremely good adsorption characteristics. The flow of Visco 959 from the column was very similar to that of an ammonium thiocyanate tracer which is non-adsorbed on the rock. Referral to the FIGURE will illustrate the use of the Visco 959 chemical and depicts the rapid depletion of the chemicals from the dolomite and therefore the small amount of gypsum scale prevention which would be obtained over a prolonged period by this procedure. Therefore, the Visco 959 washed out of the column, with only a small amount of adsorption. Although the L-37 concentration decreased very rapidly to 70 parts per million, it then remained constant for over 10 pore volumes before its concentration began to decrease significantly. The poor gypsum scale inhibition characteristics of L-37 would inhibit the use of it in a reservoir. Therefore, by examination of the chemical adsorption properties and gypsum scale prevention properties of Visco 959 and L-37, one would determine that although one adsorbs more readily and creates less gypsum scale prevention, while the other is not readily adsorbed, but presents excellent gypsum scale prevention, that the two gypsum scale preventers would behave nearly the same within the formation, with neither adequately preventing gypsum scale deposition.

By the use of the present invention, however, that is propping agents which will adsorb the gypsum scale preventative and allow a long period of dissolution of the scale preventatives from the propping agent, one will be allowed to treat a well or formation over longer periods of time and therefore prevent gypsum scale formation for longer intervals of production than previously available by the mere injection into a reservoir of a gypsum scale preventative.

EXAMPLE 2

To illustrate the many available gypsum scale preventatives, both by trade name and general chemical species which may be utilized in the present invention, Table 3 is disclosed. Table 3 illustrates the concentration in parts per million of the preventative, the precipitation time in hours, the percent scale inhibition which was obtained from the use of the gypsum scale preventative and the amount of the super-saturation of the calcium sulfate in the test water when these inhibitors are utilized with sand as the propping agent adsorbent. Therefore, by use of Table 3, one may determine a suitable gypsum scale preventative, add this gypsum scale preventative to the propping agent and hydraulically fracture the well with hydraulic fracturing fluid in conjunction with the introduction of the propping agent and thereby obtain gypsum scale inhibition.

TABLE 3.—Data

| Inhibitor; Co. name | Chemical type | Conc. (ppm) | Precipitation time (hrs.) | Percent scale inhibition | Calcium sulfate super-saturation (ppm) |
|---|---|---|---|---|---|
| Visco 950; Nalco Chem. Co | Organic phosphate | 11 | 3 | 93 | 6837 |
| | | 11 | 1 | 100 | 1823 |
| | | 22 | 3 | 99 | 2640 |
| | | 30 | 4 | 100 | 2743 |
| | | 5 | 3 | 100 | 2141 |
| L-37; Dowell | Organic phosphonate | 11 | 2 | 18 | 2107 |
| | | 22 | 3 | 8 | 2640 |
| | | 19 | 1 | 65 | 1800 |
| | | 30 | 4 | 69 | 2743 |
| | | 11 | 3 | 36 | 2141 |
| | | 22 | 3 | 68 | 2141 |
| | | 37 | 3 | 97 | 2141 |
| | | 71 | 3 | 100 | 2141 |
| S-31; Calgon Chem. Co | do | 11 | 3 | 6 | 6837 |
| | | 11 | 1 | 28 | 1823 |
| | | 22 | 1 | 20 | 1800 |
| | | 11 | 3 | 14 | 2138 |
| | | 22 | 3 | 31 | 2138 |
| Baroid H-35; Nat'l. Lead Co | Organic phosphate | 11 | 1 | 12.5 | 1823 |
| | | 22 | 4 | 39 | 1754 |
| Baroid H-36; Nat'l. Lead Co | do | 11 | 1 | 12.5 | 1823 |
| | | 22 | 4 | 19 | 1754 |
| Gyptrol VI; Cardinal Chem. Co | Organic phosphonate | 11 | 3 | 6 | 6837 |
| | | 11 | 1 | 35 | 1823 |
| | | 22 | 1 | 24 | 1800 |
| | | 11 | 5 | 5 | 2253 |
| | | 22 | 5 | 23 | 2253 |
| G-54; Champion | do | 11 | 3 | 5 | 6837 |
| | | 11 | 1 | 47 | 1823 |
| | | 22 | 1 | 27 | 1800 |
| | | 11 | 5 | 6 | 2253 |
| | | 22 | 5 | 17 | 2253 |
| P-262; Amer. Cyanamide | Polyacrylamide copolymer | 11 | 1 | 0 | 1823 |
| | | 22 | 3 | 12 | 3010 |
| | | 22 | 4 | 96 | 1754 |
| | | 30 | 4 | 3 | 2855 |
| | | 11 | 3 | 7 | 2138 |
| | | 22 | 3 | 16 | 2138 |
| Pusher 500; Dow Chem. Co | Partially hydrolyzed polyacrylamide | 11 | 1 | 91 | 1823 |
| | | 22 | 3 | 82 | 3010 |
| | | 22 | 4 | 50 | 1754 |
| | | 30 | 4 | 89 | 2855 |
| Polymer 454; Calgon Chem | Cross-linked partially hydrolized polyacrylamide. | 11 | 4 | 98 | 1789 |
| | | 22 | 4 | 74 | 1789 |
| LP-53; Haliburton | Organic liquid (polymer) polyacrylic acid | 11 | 1 | 84 | 1823 |
| | | 22 | 3 | 93 | 2640 |
| | | 30 | 3 | 91 | 2743 |
| | | 22 | 4 | 94 | 1754 |
| | | 11 | 3 | 87 | 2138 |
| | | 22 | 3 | 98 | 2138 |
| L-42; Dowell | 10 percent Zirconium chloride in water | 11 | 4 | 16 | 1789 |
| | | 22 | 4 | 6 | 1789 |
| 7637; Enjay | Anion organic liquid | 22 | 3 days | 92 | 3010 |
| | | 30 | 4 days | 93 | 2855 |
| Dimethyl phosphonate; Aldrich Chem. Co | | 22 | 3 days | 2 | 3010 |
| | | 30 | 4 days | 2 | 2855 |
| Dequest 2041; Monsanto | Ethylenediamine tetra methylene phosphonic acid. | 11 | 3 | 79 | 1749 |
| | | 22 | 3 | 90 | 1479 |
| Dequest 2010; Monsanto | 1-hydroxy, 1, 1 diphosphonic acid ethane | 11 | 3 | 97 | 1479 |
| | | 22 | 3 | 99 | 1479 |
| Calgon D-240; Calgon Chem. Co | Partially hydrolyzed polyacrylamide (similar to Pusher 500). | 11 | 3 | 77 | 2442 |
| | | 22 | 3 | 89 | 2442 |
| Calgon WC 500 | Partially hydrolyzed polyacrylamide | 11 | 3 | 87 | 2442 |
| | | 22 | 3 | 86 | 2442 |

TABLE 3.—Data—Continued

| Inhibitor; Co. name | Chemical type | Conc. (ppm) | Precipitation time (hrs.) | Percent scale inhibition | Calcium sulfate supersaturation (ppm) |
|---|---|---|---|---|---|
| Dowell J151 | do | 1 | 4 | 65 | 3909 |
| | | 11 | 3 | 89 | 2442 |
| | | 22 | 3 | 98 | 2442 |
| | | 5 | 4 | 84 | 3909 |
| | | 10 | 4 | 93 | 3909 |
| | | 25 | 4 | 95 | 3909 |
| | | 50 | 4 | 92 | 3909 |
| Corext 7640; Enjay | Organic phosphate | 11 | 5 | 94 | 2253 |
| | | 22 | 5 | 92 | 2253 |
| SP-175; Tretolyte | Organic phosphate | 11 | 2 | 100 | 1851 |
| | | 22 | 2 | 100 | 1851 |

Again referring to the FIGURE, the second curve on the FIGURE depicts the utilization of Visco 959 with sand in a packed column. It can be discerned that the rapid dissolution of the Visco 959 as observed when it is adsorbed on dolomite is curtailed and that many pore volumes of water may be passed over the propping agent before the Visco 959 gypsum scale preventative is depleted.

Through further laboratory testing, it has been found that when a concentration is decreased to a point wherein the gypsum scale preventative concentration in the produced water is below about ten parts per million, the gypsum scale prevention reaches a point at which it is ineffective for reducing gypsum scale deposition in the formation and wellbore. Therefore, it is a preferred embodiment of the present invention that the formation in the vicinity of the wellbore be retreated by the process of the present invention when the concentration of the gypsum scale preventative in the production water reaches a concentration of the gypsum scale preventative in the production water reaches a concentration of about less than ten parts per million gypsum scale preventative in the production water.

The present invention may be utilized in conjunction with various propping agents which have the adsorption property of adhering gypsum scale preventative. Typical, but not exclusive of these propping agents, would be those selected from the group consisting of sand, silica gel and alumina. In particular, the use of sand has proved to be an excellent propping agent absorbent for the gypsum scale preventative. It has been found that excellent gypsum scale preventatives are included within the organic phosphates and polyacrylamide chemical groups and that these gypsum scale preventatives, although not exclusive, are preferred in the use of the process of the present invention. Although high concentrations of preventative are desired, for example up to a one to one ratio of preventative to propping agent, the exact concentration of preventative desirable will generally be determined for each individual reservoir and waterflooding situation.

Through use of the process of the present invention, scale deposition within the formation in the vicinity of a producing wellbore and upon the producing wellbore equipment itself may be prevented by the introduction of pretreated propping agent which has a calculated amount of adsorbed scale preventative contained therein. Thereby, through continued production from the well, after treatment, the well is continually treated with scale preventative such that scale does not form and thereby block or inhibit the production of oil therefrom. Through use of the present invention, highly successful secondary recovery operations through the use of waterflooding, and especially in dolomite reservoirs which previously could not be treated by scale preventatives, may be achieved. The process has been found to be a simplified treatment for reducing scale formation in otherwise highly productive reservoirs such that high productivity may be obtained from previously inadequate production wells. The present invention provides a significant advance in the prevention of scale in the vicinity of production wells during waterflooding operations by providing a simplified economic process by which the precipitation of scale may be restrained or totally prevented. The method may be utilized in conjunction with present waterflooding media to enhance the performance thereof in reservoirs which previously were determined unsuitable for waterflooding operations due to uncontrollable scale formation.

While the invention has been described above with respect to certain embodiments thereof, it will be understood by those skilled in the art that various changes and modifications may be made without departing from the spirit or scope of the invention as presented herein.

I claim:

1. A process for inhibiting scale deposition in a producing oil well which comprises:
   a. fracturing a carbonate formation in the vicinity of a wellbore;
   b. positioning a propping agent in the fissures of the fractured formation, said propping agent being selected from the group consisting of sand, silica gel, and alumina and having an organic phosphate scale inhibitor adsorbed directly on the surface thereof,
   c. producing the oil well through the propped fissures of the formation.

2. The process of claim 1 further comprising repeating steps (a), (b) and (c) when the scale preventative concentration in the produced waters become less than about 10 parts per million.

3. The process of claim 1 in which the propping agent is positioned in the fracture by simultaneously introducing it into the calcium carbonate formation with a hydraulic fracturing fluid.

4. The process of claim 1 in which scale is calcium sulfate.

5. A process for inhibiting scale deposition in a producing oil well which comprises:
   a. fracturing a carbonate formation in the vicinity of a wellbore;
   b. positioning a propping agent in the fissures of the fractured formation, said propping agent being selected from the group consisting of sand, silica gel, and alumina and having a polyacrylamide scale inhibitor adsorbed directly on the surface thereof,
   c. producing the oil well through the propped fissures of the formation.

6. The process of claim 5 further comprising repeating steps (a), (b) and (c) when the scale preventative concentration in the produced waters become less than about 10 parts per million.

7. The process of claim 5 in which the propping agent is positioned in the fracture by simultaneously introducing it into the calcium carbonate formation with a hydraulic fracturing fluid.

8. The process of claim 5 in which the scale is calcium sulfate.

* * * * *